(12) United States Patent
Nicolaÿ et al.

(10) Patent No.: US 9,822,194 B2
(45) Date of Patent: Nov. 21, 2017

(54) UNIVERSALLY DISPERSIBLE PARTICLES CONTAINING HYDROGEN BONDS

(71) Applicants: ECOLE SUPERIEURE DE PHYSIQUE ET DE CHIMIE INDUSTRIELLES DE LA VILLE DE PARIS, Paris (FR); UNIVERSITE PIERRE ET MARIE CURIE (PARIS 6), Paris (FR); CENTRE NATIONAL DE LA RECHERCHE SCIENTIFIQUE—CNRS, Paris (FR)

(72) Inventors: Renaud Nicolaÿ, Montrouge (FR); Corinne Soulié-Ziakovic, Paris (FR); Ludwik Leibler, Paris (FR); Alexandre Prevoteau, Paris (FR)

(73) Assignees: ECOLE SUPERIEURE DE PHYSIQUE ET DE CHIMIE INDUSTRIELLES DE LA VILLE DE PARIS, Paris (FR); UNIVERSITE PIERRE ET MARIE CURIE (PARIS 6), Paris (FR); CENTRE NATIONAL DE LA RECHERCHE SCIENTIFIQUE-CNRS, Paris (FR)

( * ) Notice: Subject to any disclaimer, the term of this patent is extended or adjusted under 35 U.S.C. 154(b) by 0 days.

(21) Appl. No.: 14/442,106

(22) PCT Filed: Nov. 12, 2012

(86) PCT No.: PCT/IB2012/002741
§ 371 (c)(1),
(2) Date: May 12, 2015

(87) PCT Pub. No.: WO2014/072764
PCT Pub. Date: May 15, 2014

(65) Prior Publication Data
US 2015/0353650 A1    Dec. 10, 2015

(51) Int. Cl.
| | |
|---|---|
| *C08F 8/32* | (2006.01) |
| *C08F 12/08* | (2006.01) |
| *C09D 125/06* | (2006.01) |
| *C08J 3/02* | (2006.01) |
| *C08K 9/08* | (2006.01) |

(52) U.S. Cl.
CPC ............. *C08F 8/32* (2013.01); *C08F 12/08* (2013.01); *C08J 3/02* (2013.01); *C08K 9/08* (2013.01); *C09D 125/06* (2013.01); *C08J 2325/06* (2013.01)

(58) Field of Classification Search
CPC .......................................... C08F 8/32
USPC .......................................... 524/577
See application file for complete search history.

(56) References Cited

U.S. PATENT DOCUMENTS

| | | | |
|---|---|---|---|
| 6,259,096 B1 * | 7/2001 | Deb | G01J 5/20 250/338.1 |
| 2006/0292579 A1 * | 12/2006 | Lockhart | C07H 21/00 435/6.13 |

OTHER PUBLICATIONS

International Search Report dated Aug. 9, 2013, which issued during prosecution of International Application No. PCT/IB/002741.
Mildred Quintana, et al. "Multiple Hydrogen Bond Interactions in the Processing of Functionalized Multi-Walled Carbon Nanotubes" ACS Nano 6(1):23-31, 2012.

* cited by examiner

*Primary Examiner* — Doris Lee
(74) *Attorney, Agent, or Firm* — Vedder Price P.C.; Thomas J. Kowalski; Deborah L. Lu

(57) ABSTRACT

The present invention is directed to an entity comprising a particle attached to at least one polymer M through one or several supramolecular interactions -A-B- constituted by 2 to 8 hydrogen bonds X-H-Y, wherein A and B are functional groups respectively grafted to P and M thus forming the particle-containing entity P-(A-B-M)x with x being greater than or equal to 1, functional group(s) B being positioned at one end of the polymeric chain of polymer M, X and Y are heteroatoms present in A and B functional groups, H is hydrogen, and M has a degree of polymerization comprised between 5 and 1000, preferably ranging from 5 to 500. The invention is also directed to a method for preparing this particle-containing entity $P\text{-}(A\text{-}B\text{-}M)_x$, a method for sequentially forming and breaking the supramolecular interactions -A-B- in said particle-containing entity $P\text{-}(A\text{-}B\text{-}M)_x$ and dispersions comprising the same.

1 Claim, 1 Drawing Sheet

US 9,822,194 B2

UNIVERSALLY DISPERSIBLE PARTICLES CONTAINING HYDROGEN BONDS

RELATED APPLICATIONS AND INCORPORATION BY REFERENCE

The present application is filed pursuant to 35 U.S.C §371 as a U.S. National Phase Application of International Application No. PCT/IB2012/002741, which was filed on Nov. 12, 2012, which is published as PCT Publication No. WO 2014/072764 on May 15, 2014. The entire content of each of the aforementioned applications is incorporated herein by reference in its entirety.

SUMMARY

The present invention is directed to solid particles attached to polymers through one or several supramolecular interactions constituted by 2 to 8 hydrogen bonds, as well as dispersions containing these particles, methods of preparation of these dispersions, methods of disruption of these dispersions and methods of recovering and recycling of said solid particles.

BACKGROUND OF THE INVENTION

Small size particles, in particular microparticles or nanoparticles, are used in a very wide variety of technical fields, such as cosmetics, medicine, pharmacology, microelectromechanical systems (MEMS), printing, inks, inkjet inks, toners, semiconductors, sensors, catalysis, elastomers reinforcement, polymers reinforcements, coatings, plastic, rubbers, and the like. Other applications include ceramics, colorants, abrasion-resistant polymers, electrophotography, flavor enhancers, pesticides, or lubricants. They can indeed modify the chemical or mechanical properties of the medium in which they are introduced.

However, when dispersed in a medium, particles tend to aggregate because of interaction forces between each other, thereby destabilizing the dispersions. The medium of dispersion therefore has to be carefully adapted to the specific chemical properties of each particle in order to obtain stable dispersions and stability additives are often additionally required.

One approach to stabilize particles in dispersion is to adsorb or graft polymers to their surface. Repulsion occurs between the particles due to steric or electrostatic interactions induced by the polymer chains within the dispersing medium, thereby stabilizing the dispersion.

However, for steric or electrostatic interactions to occur, the polymer needs to be solubilized into the dispersing medium. Therefore, the particles grafted or adsorbed with the polymer can only be dispersed in some specific media that are able to solubilize the polymer. Thus, with this approach, once the particles are grafted with the polymer, it is not possible to disperse them in any kind of medium.

Moreover, once the particles are grafted or adsorbed with the polymer on their surface, they can no longer be recovered as bare particles and reused. Hence, the chemical modification of the particles is not reversible.

SUMMARY OF THE INVENTION

Therefore, there is a need for particles that can easily be dispersed in solvents or media of any chemical nature thus providing long-term stable dispersions, and that would be easily recovered to be re-dispersed in others media.

The present invention meets all those needs by providing new solid particles P attached to at least one polymer M through one or several supramolecular interactions -A---B- constituted by several hydrogen bonds, thereby becoming universally dispersible in any media, i.e. particles that can be dispersed in a stable way in solvents of any chemical nature, reactive solvents, resins, matrices, as well as dispersions of these particles that are reversible and controllable, i.e. where particles may be further aggregated, recovered and then re-dispersed, if desired.

DETAILED DESCRIPTION OF THE INVENTION

Figure 1:
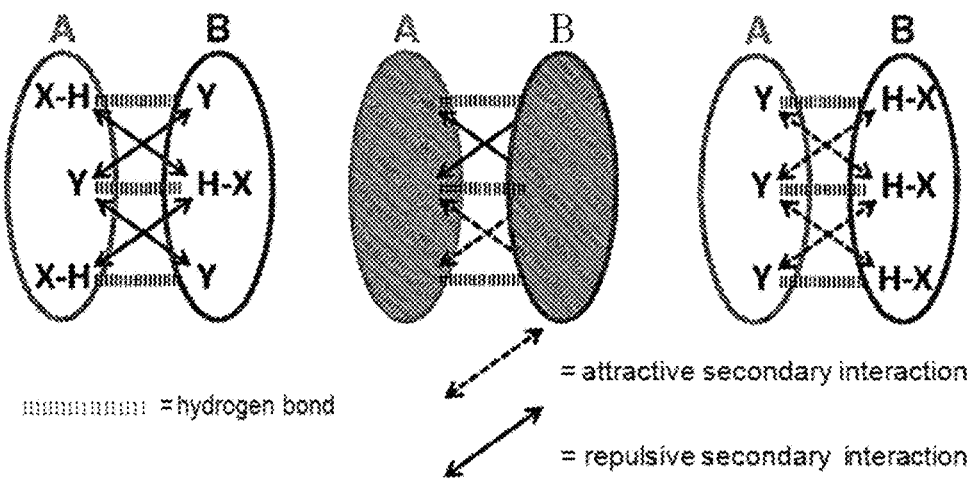
FIG. 1 is a schematic representation of host-guest supramolecular interactions containing three hydrogen bonding sites.

In one embodiment, the present invention is directed to a particle-containing entity $P\text{-}(A\text{---}B\text{-}M)_x$ wherein P is a solid particle attached to at least one polymer M through one or several supramolecular interactions -A---B- constituted by 2 to 8 hydrogen bonds X—H---Y, wherein A and B are functional groups respectively grafted to P and M thus forming the particle-containing entity $P\text{-}(A\text{---}B\text{-}M)_x$ with x being greater than or equal to 1, functional group(s) B being positioned at one end of the polymeric chain of polymer M,
X and Y are heteroatoms present in A and B functional groups, H is hydrogen, and
M has a degree of polymerization comprised between 5 and 1000, preferably ranging from 5 to 500.

In another embodiment, the present invention is directed to a method for preparing said particle-containing entity $P\text{-}(A\text{---}B\text{-}M)_x$, said method comprising the following steps:
  attaching the functional group A to the surface of the solid particle P, thereby forming A-functionalized particles P,
  attaching the functional group(s) B to one end of the polymeric chain of polymer M, thereby forming B-functionalized polymers M, and wherein the functional group B is able to form a supramolecular interaction -A---B- with the functional group A through 2 to 8 hydrogen bonds,
  mixing the A-functionalized particles P with at least one B-functionalized polymer M to form supramolecular interactions -A---B- constituted by 2 to 8 hydrogen bonds, thereby forming the particle-containing entity $P\text{-}(A\text{---}B\text{-}M)_x$ with x being greater than or equal to 1.

In another embodiment, the present invention is directed to a method for sequentially forming and breaking the supramolecular interactions -A---B- in the particle-containing entity $P\text{-}(A\text{---}B\text{-}M)_x$ described above, said method comprising the following steps:
  attaching the functional group A to the surface of the solid particle P, thereby forming A-functionalized particles P,
  attaching the functional group(s) B to one end of the polymeric chain of polymer M, thereby forming B-functionalized polymers M, and wherein the functional group B is able to form supramolecular interactions with the functional group A through 2 to 8 hydrogen bonds, mixing the A-functionalized particles P with at least one B-functionalized polymer M to create supramolecular interactions -A---B- constituted by the 2 to 8 hydrogen bonds, thereby forming the particle-containing entity P-(A---B-M)$_x$, breaking the supramolecular interactions -A---B- that link the A-functionalized particles and the B-functionalized polymers M.

In another embodiment, the present invention is directed to a dispersion of solid particles P in a medium, wherein each solid particle P is attached to at least one polymer M through one or several supramolecular interactions -A---B- constituted by 2 to 8 hydrogen bonds X—H---Y, wherein A and B are functional groups respectively grafted to P and M thus forming a particle-containing entity P-(A---B-M)$_x$ with x being greater than or equal to 1, functional group(s) B being positioned at one end of the polymeric chain of polymer M, X and Y are heteroatoms present in A and B functional groups, and H is hydrogen, and M is a stabilizing agent capable of dispersing the particle P in said medium and has a degree of polymerization comprised between 5 and 1000, preferably ranging from 5 to 500.

In another embodiment, the present invention is directed to a method for preparing the said dispersion of solid particles P in a medium, said method comprising the following steps:

attaching the functional group A to the surface of the solid particle P, thereby forming A-functionalized particles P, attaching the functional group(s) B to one end of the polymeric chain of polymer M, thereby forming B-functionalized polymers M, and wherein the functional group B is able to form supramolecular interactions with the functional group A through 2 to 8 hydrogen bonds, mixing the A-functionalized particles P with at least one B-functionalized polymer M to create a supramolecular interactions -A---B- constituted by 2 to 8 hydrogen bonds, thereby forming the particle-containing entity P-(A---B-M)$_x$ with x being greater than or equal to 1, dispersing the particle-containing entity P-(A---B-M)$_x$ in the medium.

In another embodiment, the present invention is directed to a method for sequentially dispersing and aggregating A-functionalized particles P in a medium, said method comprising the following steps:

preparing a dispersion of A-functionalized solid particles P in said medium as described above, thereby forming the particle-containing entity P-(A---B-M)$_x$ dispersed in said medium wherein the B-functionalized polymers M are reversibly attached to the A-functionalized particles P through one or several supramolecular interactions -A---B- constituted by the 2 to 8 hydrogen bonds, aggregating the A-functionalized particles P by either reducing the solubility of the polymers M in the medium and/or by breaking the supramolecular interactions -A---B-.

The particle-containing entity P-(A---B-M)$_x$ of the present invention can be used to prepare stable dispersions of A-functionalized solid particles P in media of any chemical nature, by choosing the appropriate B-functionalized polymer M which is able to solubilize in said medium and induce steric or electrostatic repulsion between the particle-containing entity P-(A---B-M)$_x$, thereby stabilizing the dispersion.

Thanks to the specific properties of supramolecular interactions -A---B-, the A-functionalized solid particles P can be recovered from the dispersions by either:

first aggregating the particle-containing entity P-(A---B-M)$_x$. and then breaking the supramolecular interactions -A---B-, or first breaking the supramolecular interactions -A---B-, and then recovering the A-functionalized particles P.

In the context of the present invention, the supramolecular interaction -A---B- is formed between a functional group A and a functional group B that are respectively grafted to the particle P and the polymer M.

As a result, any kind of B-functionalized polymers M may be attached to any kind of A-functionalized particles P, provided that the functional group A and the functional group B can form the supramolecular interactions through the formation of hydrogen bonds.

The Solid Particles P

It is understood that the present invention is not limited to a specific solid particle, but encompasses any kind of particles, including mineral, organic, or mixed particles.

Mineral particles may include, but are not limited to, metal particles. Metal particles encompass particles formed exclusively with metals chosen among alkaline earth metal, transitional metal, rare earth metal, and alloys thereof. In some embodiments, the metal may be aluminum, copper, cadmium, selenium, silver, gold, indium, iron, platinum, nickel, molybdenum, silicon, titanium, tungsten, antimony, palladium, zinc, tin, and alloys thereof. These metal particles may be metal organomodified nanoparticles having chemical entities grafted to their surface or having a self-assembled monolayer of compounds, such as organosulfur compounds, on their surface.

In some embodiments, particles may be particles of metal oxides, such as titanium, zinc, cerium, zirconium or aluminum oxide, of bismuth oxychloride, carbides, nitrides, borides, sulfides or hydroxides, inorganic salts, for instance, barium sulfate, calcium carbonate, calcium sulfate, calcium phosphate, magnesium hydrogen carbonate, metal soaps derived from organic carboxylic acids having from 8 to 22 carbon atoms, preferably from 12 to 18 carbon atoms, for instance zinc stearate, magnesium or lithium stearate, zinc laurate, magnesium myristate, clays, silicates, alumina, silica, kaolin, or hydroxyapatite.

The particles may also be organic particles, typically formed from an organic polymer.

Organic polymers encompass, but are not limited to, polystyrene, poly(vinyl acetate), poly(-methylstyrene), poly (acrylamide), poly(acrylonitrile), poly(vinyl chloride), copolymers of styrene and C1-C4alkyl (meth)acrylate, copolymers of styrene and acrylamide, copolymers of styrene and acrylonitrile, copolymers of styrene and vinyl acetate, copolymers of acrylamide and C1-C4 alkyl (meth) acrylates, copolymers from acrylonitrile and C1-C4 alkyl (meth)acrylate, copolymers of acrylonitrile and acrylamide, terpolymers from styrene, acrylonitrile and acrylamide, poly (methyl methacrylate), poly(ethyl methaerylate), copolymers styrene/butadiene, styrene/acrylic acid, styrene/vinylpyrrolidone and butadiene/acrylonitrile.

For instance, organic nanoparticles include, but are not limited to, nylon (ex: "ORGASOL 2002 ED NAT COS" marketed by ATOCHEM), polyethylene powders (ex: "COATHYLENE HA 1681" marketed by PLAST LABOR), poly-2-alanine powders, polyfluorinated powders such as polytetrafluoroethylene (ex: "MP 1400" marketed by DUPONT DE NEMOURS), acrylic copolymer powders (ex "POLYTRAP Q5 6603" marketed by DOW CHEMICA), polystyrene powders (ex: "POLYSPHERE 3 000 SP" marketed by PRESPERESE), polyester powders, expanded microspheres in thermoplastic material (ex: "EXPANCEL 551 DE" marketed by EXPANCEL), microballs of silicon resins (ex: (Tospearls marketed by TOSHIBA), synthetic hydrophil polymer powders such as polyacrylates (ex: "MICROPEARL M 100" marketed by MATSUMOTO), acrylic polyamides (ex: those marketed by ORIS), insoluble polyurethanes (ex: "PLASTIC POWDER D 800" marketed by TOSHNU), porous microspheres of cellulose, micro- or nanoparticles of PTFE (polytetrafluoroethylene).

In some embodiments, particles may be pigments. These pigments can be, but are not limited to, pigments used in ink compositions (including inkjet ink compositions), coating compositions (including paint formulations), liquid and solid toners, films, plastics, rubbers, and the like. Examples include, but are not limited to, black pigments (e.g., carbon products like carbon black) and other colored pigments (e.g., polymeric and organic pigments, or inorganic pigments). The colored pigment can be blue, black, white, brown, cyan, green, violet, magenta, red, yellow, as well as mixtures thereof. Organic colored pigments include, for example, phthalocyanine blues (copper phthalocyanine blue and derivatives thereof such as Pigment Blue 15), phthalocyanine greens, anthraquinones (Pigment Red 43, Pigment Red 194 (Perinone Red), Pigment Red 216 (Brominated Pyanthrone Red) and Pigment Red 226 (Pyranthrone Red)), diazos, monoazos, pyranthrones, perylenes (Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224), heterocyclic yellows (Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow, Pigment Yellow 117, Pigment Yellow 128 and Pigment Yellow 138), quinacridones (Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42), and (thio)indigoids (Pigment Red 86, Pigment Red 87, Pigment Red 88, Pigment Red 181, Pigment Red 198, Pigment Violet 36, and Pigment Violet 38). Such pigments are commercially available in either powder or press cake form from a number of sources including, BASF Corporation, Engelhard Corporation and Sun Chemical Corporation. Examples of other suitable colored pigments are described in the *Colour Chemistry*, H. Zollinger, 3rd edition, Wiley-VCH, Weinheim, 2003. ISBN: 3-906390-23-3.

Suitable classes of inorganic colored pigments include, for example, titanium dioxide, zinc sulphides, zinc sulfoselenides, zinc oxide, iron oxides (goethite, lepidocrocite, hematite, maghemite, magnetite), chromium oxide green, chrome yellow, cadmium pigments (sulfides and sulfoselenides), antimony trioxyde, calcium chromate, cerulean blue (cobalt stannate). Such pigments are commercially available in either powder or press cake form from a number of sources including, Cabot, Degussa, Ciba-Geigi, Union Colours, and Merck. Examples of other suitable inorganic colored pigments are described in the *Industrial Inorganic Pigments*, G. Bunxbaum, VCH, Weinheim, 1993. ISBN: 3-527-28624-1.

Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Columbian Chemical Corporation) and MAI 00 and MA440 available from Mitsubishi Chemical Corporation. The carbon may be of the crystalline or amorphous type. Examples include, but are not limited to, graphite, carbon black, vitreous carbon, carbon fibers, activated charcoal, activated carbon.

In a particular embodiment, the particles can be conductive particles, such as carbon nanotubes (CNTs) for example.

In another particular embodiment, the particles can be magnetic particles, such as ferrites or magnetites for example.

In a further embodiment, the particles may be used as catalysts.

In a preferred embodiment, the solid particles can be chosen among metal, metal oxide, silica, cellulose particles, carbon nanotubes (CNTs), graphene sheets, or pigments, such as $TiO_2$, $Cr_2O_3$, $Fe_2O_3$, $Fe_3O_4$ anthraquinones, phtalocyanines, perylene, quinacridone, indigoid, conductive or magnetic particles, or particles that may be used as catalysts.

The solid particles of the invention may be of any size, and can in particular be microparticles or nanoparticles.

The particles used in the context of the present invention can for example have a particulate size ranging from 0.005 and 1000 μm, more preferably from 0.01 and 100 μm, and even more preferably from 0.01 and 10 μm.

In a preferred embodiment, the solid particles are grafted with functional groups A capable of forming supramolecular interactions attached to their surface (herein denoted "A-functionalized particles P").

In the context of the present invention, the A-functionalized particles P are attached to at least one B-functionalized polymer M through one or several supramolecular interactions -A---B- constituted by 2 to 8 hydrogen bonds X—H---Y, X and Y being heteroatoms present in A and B functional groups, and H being hydrogen, preferably M being capable of dispersing the particle P in the desired medium.

In a specific embodiment, the A-functionalized particles P can be attached to several B-functionalized polymers M of different chemical natures or compositions; M being preferably capable of dispersing the particle P in the desired medium. In this embodiment, it is therefore possible to affect the dispersability of the particles with multiple stimuli or to allow dispersability of the particles P in different media in which each grafted polymer may be solubilized.

In a preferred embodiment, the A-functionalized particles P should have enough B-functionalized polymers M attached to their surface to allow a good dispersability of the particles within the medium. The number of polymers M necessary to ensure good dispersibility of the particles will fully depends on the nature of the particles P, the polymers M and the medium and can be adjusted by the skilled person.

In this preferred embodiment, the A-functionalized particles P should have enough functional groups A forming supramolecular interactions -A---B- with the B-functionalized polymers M, and preferably should have at least the same number of functional groups A as of B-functionalized polymers M necessary to ensure good dispersability of the particles.

Indeed, without willing to be bound by any theory, it has been observed that when polymers M are attached to the surface of particles P, the polymers attached around the particle surface isolate the particles from one another, thus creating repulsion between the particles. The repulsion may be steric or electrostatic, as long as it prevents the particles from aggregating with each other in the medium. The more polymers M are attached to each particle P, the more repulsion will be induced between the particles, thereby stabilizing the dispersion.

The A-functionalized particles P may be prepared according to techniques well-known by the person skilled in the art for example as disclosed in Aryl Diazonium Salts, Mohamed Mehdi Chehimi (Editor), Publisher: Wiley-VCH; ISBN-10: 3527329986, ISBN-13: 978-3527329984.

The Polymers M

The A-functionalized solid particles P of the invention are reversibly attached to at least one polymer M through one or several supramolecular interactions -A---B- constituted by several hydrogen bonds.

The B-functionalized polymers M used in the present invention have a degree of polymerization comprised between 5 and 1000, preferably ranging from 5 to 500.

In a preferred embodiment, M is a stabilizing agent capable of dispersing the particle P in a medium, that is to say that it prevents the formation of particles aggregates and it improves the stability of the dispersion of particles in the medium.

The dispersions of the invention for example do not comprise aggregates bigger than 20 am, in particular do not comprise aggregates bigger than 10 m, as observed by optical microscopy.

As for the solid particles, it should be understood that the present invention is not limited to a specific type of polymers M in term of composition, topology and functionality.

The polymer M can for example be organic, inorganic, hydrophilic, hydrophobic, neutral or ionic. Polymer M may be linear, branched, hyperbranched, grafted, comb-like, bottle-brush-like, star-like or a combination of these topologies. Polymer M may also be a homopolymer, a block copolymer, a random copolymer, a gradient copolymer, an alternating copolymer or a multiblock copolymer.

In a preferred embodiment, when the B-functionalized polymer M has a branched, hyperbranched, grafted, comb-like or bottle-brush-like structure, the functional group(s) B are located at one-end of the backbone of polymer M.

In another preferred embodiment, when the B-functionalized polymer M has a star-like structure, the functional group(s) B are located at one-end of one arm of polymer M.

Polymers M may be polar, apolar, hydrophilic, hydrophobic, neutral, positively and/or negatively charged.

All polymers which are already used in the state of the art for that purpose can be used in the present invention (Practical Dispersion: A Guide to Understanding and Formulating Slurries; R. F. Conley; Editeur: John Wiley & Sons Inc (Mar. 27, 1996); ISBN-10: 0471186406; ISBN-13: 978-047118640; Colloidal Polymers: Synthesis and Characterization; Editeur: Marcel Dekker Inc (Aug. 6, 2003), ISBN-10: 0824743040, ISBN-13: 978-0824743048). The polymers might include n types of repeating units, with n ranging from 1 to 20, and preferably ranging from 1 to 6.

The polymers might be obtained by radical polymerization, controlled radical polymerization, coordination polymerization, metathesis polymerization, ring opening polymerization, anionic polymerization, cationic polymerization, polycondensation or polyaddition.

Polymers M include, but are not limited to, polyolefins, polyolefin copolymers, poly(vinyl chloride), polystyrene and styrenics polymers polydienes, polylactones, polylactames, polycarbonates, polyamides, polyamines, polyelectrolytes, polyesters, polyethers, polyimides, polyimines, polymers containing sulfur, methacrylates polymers, acrylate polymers, acrylonitrile, polyethylene glycol, chlorinated polymers such as poly(vinyl chloride), fluorinated polymers and other halogenated polymers, ionomeric polymers, poly (vinyl ketone), polymers containing ketone groups, liquid crystal polymers, polymers containing olefinic double bond(s), poly(phenylene oxide), poly(vinyl alcohol), polyurethanes, polyureas, acetal polymers, poly(vinyl ester)s, thermoplastic elastomers, and the like.

Polymers M also include copolymers of the previously cited polymers.

Polymers M may also be biopolymers.

Polymers M also include stimuli responsive polymers. Stimuli responsive polymers are well known by the person skilled in the art for example from the disclosures (Emerging applications of stimuli-responsive polymer materials; M. A. Cohen Stuart et al.; Nature Materials, 9 (2010), 101-113; or Recent advances and challenges in designing stimuli-responsive polymers; F. Liu, M. W. Urban; Progress in Polymer Science, 35 (2010) 3-23) This class of polymers encompasses polymers of which properties are sensitive to physicochemical parameters, such as light, pH, temperature, polarity, ionic strength, electrical or magnetic field for example.

According to the invention, polymers M are chosen depending on the medium in which particles are intended to be dispersed. Said polymers M should preferably be soluble in said medium. Indeed, without willing to be bound by any theory, it has been observed that when polymers M are attached to the surface of the particles P, part of the polymer is bounded to the surface of the particle, while the rest of the molecule extend away from the particle surface into the medium, thereby inducing repulsion between the particles. The repulsion may be steric or electrostatic, as long as it prevents the particles from aggregating with each other in the medium. The more the polymers M are soluble in the medium, the more they induce repulsion between particles, thereby stabilizing the dispersion. When the medium in which particles are dispersed is a polymer melt, said polymers M and melt chains from the polymer melt should preferably present a negative Flory interaction parameter X.

The B-functionalized polymers M may be prepared according to techniques well-known by the person skilled in the art (Macromolecular Engineering: Precise Synthesis, Materials Properties, Applications; K. Matyjaszewski, Y. Gnanou, L. Leibler; Editeur: Wiley-VCH Verlag GmbH (Feb. 23, 2007), ISBN-10: 3527314466; ISBN-13: 978-3527314461; Supramolecular Polymers; L. Brunsveld, B. J. B. Folmer, E. W. Meijer, and R. P. Sijbesma; Chem. Rev. 2001, 101, 4071; Suppression of Mesoscopic Order by Complementary Interactions in Supramolecular Polymers; J. Cortese, C. Soulid-Ziakovic, S. Tencd-Girault, and L. Leibler; J. Am. Chem. Soc. 2012, 134, 3671).

In the present invention, the functional group(s) B is positioned at one end of the polymeric chain of polymer M.

In a preferred embodiment, B-functionalized polymers M have only one functional group B able to form supramolecular interactions, positioned at one end of the polymeric chain of polymer M.

B-functionalized polymers M containing one functional group B located at one end of the polymer chain can either be prepared by post-polymerization functionalization of one chain-end or by using a polymerization initiator that contains the B functional group.

In a preferred embodiment, the B-functionalized polymers M may contain several functional groups B able to form supramolecular interactions -A---B- with the A-functionalized particle P. In that case, the functional groups B are positioned in a block specifically located at one end of the polymeric chain of polymer M. The block containing the functional groups B may have a degree of polymerization comprised between 1 and 20 and preferably comprises 1 to 10 functional group(s) B.

The specific and precise location of the functional groups B at one end of polymer M chains is a key characteristic of the B-functionalized polymers M described in the present invention. This is crucial to prevent the aggregation of the A-functionalized particles P within a dispersing medium, in particular for concentrations of A-functionalized particles lower or equal to 25% by weight of the dispersion and for concentrations of B-functionalized polymers lower or equal to 50% by weight of the dispersion.

The aggregation of A-functionalized particles depends on the position of the functional groups B along the polymeric chain of polymers M. The more the functional groups B are distributed and spaced apart within the polymer M, the more aggregation of A-functionalized particles P will be favored. For instance, when B-functionalized polymer M contains several functional groups B able to form supramolecular interactions -A---B- with A-functionalized particles P, and when the functional groups B are randomly distributed along the entire polymeric chain or are specifically located at both ends of the polymeric chain, the B-functionalized polymers M will be able to form supramolecular interactions -A---B- with several A-functionalized particles P. This will ultimately cause aggregation of the particles P in the medium as described in the literature (Multiple Hydrogen Bond Interactions in the Processing of Functionalized Multi-Walled Carbo Nanotubes, M. Quintana et al., ACSNano, 6(1), 23-31 (2012); Polymer-Mediated Dispersion of Gold Nanoparticles: Using Supramolecular Moieties on the Periphery; A. D. Celiz, T-C. Lee, and O. A. Scherman; Adv. Mater. 2009, 21, 3937).

In another preferred embodiment, a B-functionalized polymer M can only be attached to one A-functionalized particle P at a time.

In a preferred embodiment, when the A-functionalized particles P are to be dispersed in a reactive medium or in a reactive polymer melt, the B-functionalized polymers M may further contain pending polymerizable groups G. The B-functionalized polymers M may contain between 1 and 10 polymerizable groups G, and preferably between 1 and 5.

By "reactive" medium or polymer melt, it should be understood within the meaning of the present invention, that the medium or the polymer melt is polymerizable and/or cross-linkable.

Polymerizable groups G may be any type of functional groups that can be polymerized either by radical polymerization, coordination polymerization, metathesis polymerization, ring opening polymerization, anionic polymerization, cationic polymerization, polycondensation or polyaddition.

Polymerizable groups G include, but are not limited to, olefins, vinyl chloride derivatives, styrenic monomers, dienes, isoprene, lactones, lactames, carbonates, epoxides, anhydrides, acrylates, methacrylates, acrylamides, methacrylamides, vinyl esters, isocyanates, alcohols, amines, and the like.

In one embodiment, the polymerizable groups G may be positioned in a block specifically located at one end of the polymeric chain of polymer M. In this embodiment, when functional groups B are already located at one end of the polymeric chain of polymer M, groups G will not be located at the end of the polymeric chain where functional groups B are positioned.

In another embodiment, the polymerizable groups G may be distributed along the polymeric chain of polymer M. Distribution of polymerizable groups G along the polymeric chain of polymer M may follow a statistical, a gradient, an alternating or a block pattern.

Supramolecular Interaction

According to the invention, the B-functionalized polymers M are reversibly attached to the A-functionalized particles P through one or several supramolecular interactions -A---B- constituted by 2 to 8 hydrogen bonds X—H---Y, X and Y being heteroatoms present in A and B functional groups, and H being hydrogen.

Hydrogen bonding is directional and arises from a combination of electrostatic, induction, charge-transfer and dispersion forces. Hydrogen bonds connect hydrogen atoms with heteroatoms X or Y that have electronegativities larger than that of hydrogen. Generally, the X-H entity is called the hydrogen bond donor and the Y atom the hydrogen bond acceptor.

In the context of the present invention, the supramolecular interactions -A---B- are constituted by 2 to 8 hydrogen bonds and preferably 3 or 4 hydrogen bonds X—H---Y.

In a preferred embodiment, the heteroatoms X and Y may be the same or different, and can be chosen from nitrogen, oxygen, sulfur, phosphorus, fluorine, chlorine, bromine, and iodine, and preferably from nitrogen and oxygen.

In another preferred embodiment, the functional groups A and B will be chosen for their strong tendency to form heterodimers A---B rather than homodimers A---A and B---B and the association constant of the heterodimer should be at least ten times larger than the dimerization constant of each homo dimer, and preferably more than one hundred times larger.

Depending on the nature of the medium in which solid particles P are to be dispersed or on the targeted application, it may be desirable to modulate the strength of the supramolecular interaction -A---B-.

Without willing to be bound by any theory, it has been observed that the strength of the hydrogen bond strongly depends on the electron distribution over the hydrogen bonding sites. Therefore, a way to adjust the hydrogen-bond strength is to modulate the electron density on hydrogen-bonding sites through the addition of electron-donating or electron-withdrawing substituents on the hydrogen-bonding motifs A and/or B. A second approach preferred in the context of the present invention is to play on the number of hydrogen bonds constituting the supramolecular interaction -A---B-. Increasing the number of hydrogen bonding sites will increase the strength of the supramolecular interactions -A---B-. It has also been shown that the particular arrangement of neighboring donor (X-H) and acceptor (Y) sites is an additional factor that significantly affects the strength of the association. This effect is due to differences in secondary interactions between these sites. In host-guest systems containing hydrogen-donor and hydrogen-acceptor sites, diagonally opposed sites repel each other electrostatically when they are both donors or both acceptors, whereas disparate sites attract each other. In the (X-H)(X-H)(X-H)---(Y)(Y)(Y) motif the number of attractive secondary interactions is maximized, and in the (Y)(X-H)(Y)---(X-H)(Y)(X-H) motif the number of repulsive interactions is at its largest (Macromolecular Engineering: Precise Synthesis, Materials Properties, Applications; K. Matyjaszewski, Y. Gnanou, L. Leibler; Editeur: Wiley-VCH Verlag GmbH (Feb. 23, 2007), ISBN-10: 3527314466; ISBN-13: 978-3527314461; Supramolecular Polymers; L. Brunsveld, B. J. B. Folmer, E. W. Meijer, and R. P. Sijbesma; Chem. Rev. 2001, 101, 4071; Methods of modulating hydrogen bonded interactions in synthetic host-guest systems; G. Cooke and V. M. Rotello; Chem. Soc. Rev., 2002, 31, 275; Molecular Self-Assembly Organic Versus Inorganic Approaches, M. Fuiita, Structure & Bonding, Volume 96, 2000, ISSN 0081-5993, ISBN 3-540-66948-5, Springer-Verlag Berlin Heidelberg New York).

This can be more clearly explained by FIG. 1, which is a schematic representation of host-guest supramolecular interactions containing three hydrogen bonding sites.

Therefore, in a preferred embodiment of the present invention, functional groups A and B are selected so that hydrogen donating groups X-H of functional group A will face hydrogen accepting groups Y of functional group B.

In the same manner, functional groups A and B are selected so that hydrogen accepting groups Y of functional group A will face hydrogen donating groups X-H of functional group B.

Figure 2:
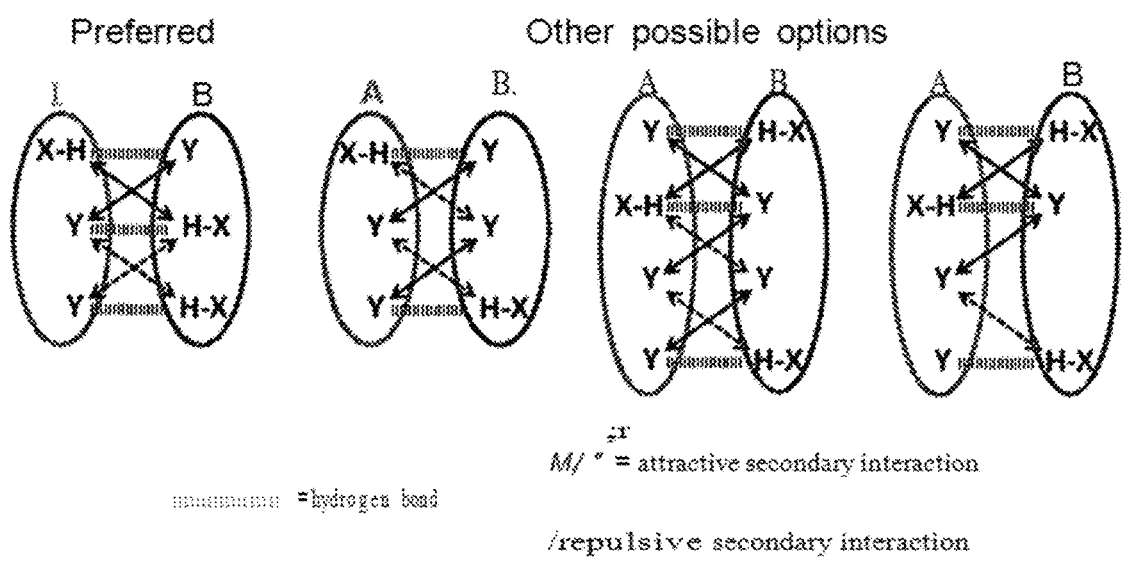
FIG. 2 is a schematic representation of host-guest supramolecular interactions containing multiple hydrogen bonding sites.

This can be more clearly explained by FIG. 2, which is a schematic representation of host-guest supramolecular interactions containing multiple hydrogen bonding sites.

For instance, functional groups A and B capable of forming supramolecular interactions -A---B- constituted of 2 to 8 hydrogen bonds may include, but are not limited to, nucleobases such as thymine (Thy), cytosine, guanine, adenine, uracil, and derivatives, diaminotriazine (DAT) derivatives, 2,6-di(acetylamino)-4-pyridyl, ureidopyrimidinone (UPy) derivatives, naphthyridine (Napy) derivatives, Hamilton receptor, imidazolidone derivatives, urea and polyurea derivatives, amide and polyamide derivatives.

A large number of functional groups A and B capable of forming supramolecular interactions -A---B- constituted of 2 to 8 hydrogen bonds have been described in the literature (Comprehensive Supramolecular Chemistry; J. L. Atwood, J. E. D. Davies, D. D. MacNicol, F. Vogtle (editors); Elsevier, Oxford 1996, ISBN-10: 0080406106; ISBN-13: 978-0080406107; Supramolecular Polymers; L. Brunsveld, B. J. B. Folmer, E. W. Meijer, and R. P. Sijbesma; Chem. Rev. 2001, 101, 4071; Methods of modulating hydrogen bonded interactions in synthetic host-guest systems; G. Cooke and V. M. Rotello; Chem. Soc. Rev., 2002, 31, 275; Molecular Self-Assembly Organic Versus Inorganic Approaches, M. Fuiita, Structure & Bonding, Volume 96, 2000, ISSN 0081-5993, ISBN 3-540-66948-5, Springer-Verlag Berlin Heidelberg New York).

One advantage of the invention is that the A-functionalized particles P can be recovered for a further re-use.

Indeed, the particle-containing entity P-(A---B-M), dispersed in the medium may be then aggregated by breaking the supramolecular interactions -A---B- by any techniques well know by the person skilled in the art, and preferably by adding a strong dissociating agent such as dimethyl sulfoxide (DMSO) (Macromolecular Engineering: Precise Synthesis, Materials Properties, Applications; K. Matyjaszewski, Y. Gnanou, L. Leibler; Editeur: Wiley-VCH Verlag GmbH (Feb. 23, 2007), ISBN-10: 3527314466; ISBN-13: 978-3527314461; Binding Mechanisms in Supramolecular Complexes, H.-J. Schneider, Angew. Chem. Int. Ed. 2009, 48, 3924; Molecular Self-Assembly Organic Versus Inorganic Approaches, M. Fuiita, Structure & Bonding, Volume 96, 2000, ISSN 0081-5993, ISBN 3-540-66948-5, Springer-Verlag Berlin Heidelberg New York).

Dissociating agents are typically small polar and/or protic heteroatomic organic molecules that can act as hydrogen-acceptor or hydrogen-donor. Therefore, these molecules can disrupt the host-guest supramolecular interactions -A---B- by breaking the hydrogen-bonds that link the X-H and Y hydrogen-bonding sites within functional groups A and B.

For instance, dissociating agents capable of disrupting supramolecular interactions -A---B- constituted of 2 to 8 hydrogen bonds may include, but are not limited to dimethyl sulfoxide (DMSO), water, alcohols, 2-pyrrolidine, 2-pyrrolidone, N,N-dimethyformamide (DMF), N-methylformamide, formamide.

As previously mentioned, the strength of supramolecular interactions -A---B- based on hydrogen bonding depends on various parameters well known by the person skilled in the art. As a result, some dissociating agents will be able to disrupt weaker supramolecular interactions -A---B- while they will not disrupt stronger supramolecular interactions -A---B-.

In addition, the ability to act as hydrogen-donor or acceptor is not the only parameter that should be considered when selecting a dissociating agent. The ability of the dissociating agent to solubilize the host-guest hydrogen-bonding motifs and/or the part of the polymeric chain that contains the functional groups B on polymers M can also be taken into account.

Therefore, the stability of supramolecular interactions -A---B- toward a specific dissociating agent can also be modulated by playing on the affinity between the dissociating agent and the host-guest hydrogen bonding motifs or the part of the polymeric chain that contains the functional groups B on polymers M.

The applicants have observed that by adjusting the strength of the supramolecular interaction -A---B- and/or by playing of the affinity between the dissociating agent and the host-guest bonding motifs and/or the part of the polymeric chain that contains the functional groups B on polymers M it is possible to form particle-containing entity P-(A---B-M)$_x$ or stable dispersion of said particle-containing entities P-(A---B-M)$_x$ in solution or medium containing molecules that are usually considered as dissociating agents.

A representative example is the formation of particle-containing entity P-(A---B-M)$_x$ or stable dispersion of said particle-containing entities P-(A---B-M)$_x$ in aqueous solutions.

After aggregation, the A-functionalized particles P may be recovered by physical separation, such as filtration or centrifugation.

After recovery, the A-functionalized particles P may be then re-dispersed in the same or in a different medium after having attached new appropriate B-functionalized polymers M.

Dispersion

The present invention is also directed to a dispersion of solid particles P in a medium, wherein each solid particle P is attached to at least one polymer M through one or several supramolecular interactions -A---B- constituted by 2 to 8 hydrogen bonds X—H---Y, wherein A and B are functional groups respectively grafted to P and M thus forming a particle-containing entity P-(A---B-M)$_x$ with x being greater than or equal to 1, functional group(s) B being positioned at one end of the polymeric chain of polymer M, X and Y are heteroatoms present in A and B functional groups, and H is hydrogen, and M is a stabilizing agent capable of dispersing the particle P in said medium and has a degree of polymerization comprised between 5 and 1000, preferably ranging from 5 to 500.

In a preferred embodiment, in the dispersions of the present invention, the A-functionalized particles can be present in an amount of less- or equal to 25% by weight of the dispersion and B-functionalized polymers M can be present in an amount of less or equal to 50% by weight of the dispersion.

In a preferred embodiment, the polymers M are soluble or solubilized in the medium and induce steric or electrostatic repulsion between the particles in the medium.

The solid particles P used in the dispersions of the invention can be of any kind as previously indicated, but can preferably be chosen among metal, metal oxide, silica, cellulose particles, carbon nanotubes (CNTs), graphene sheets, or pigments, such as TiO2, Cr2O3, Fe2O3, Fe3O4 anthraquinones, phthalocyanines, perylene, quinacridone, indigoid, conductive or magnetic particles, or particles that may be used as catalysts.

The polymers used in the dispersions of the invention can be of any kind as previously indicated and for example chosen among organic, inorganic, hydrophilic, hydrophobic, neutral or ionic. Polymer M may be linear, branched, hyperbranched, grafted, comb-like, star-like, bottle-brush-like or a combination of these topologies. Polymer M may also be a homopolymer, a block copolymer, a random copolymer, a gradient copolymer, an alternating copolymer or a multiblock copolymer.

The dispersion or aggregation of the particle-containing entities P-(A---B-M)$_x$ within the dispersing phase may be also controlled by adjusting the temperature of the medium, for instance when reaching the θ-temperature. If a solvent is precisely poor enough to cancel the effects of excluded volume expansion, the theta (θ) conditions are satisfied. For a given polymer-solvent pair, the theta conditions are satisfied at a certain temperature, called the theta temperature. For polymer-solvent systems exhibiting an upper critical solution temperature, polymer chains are soluble in the given solvent above the theta temperature and precipitate below the theta temperature. For polymer-solvent pairs exhibiting a lower critical solution temperature, polymer chains are soluble in the given solvent below the theta temperature and precipitate above the theta temperature. In that case, the polymer M which stabilizes the dispersion by steric or electrostatic repulsions can swell or collapse either by heating or cooling the dispersion. Compilations of theta temperatures and theta solvents are available in the literature. (Polymer Handbook, 4th Edition; J. Brandrup, E. H. Immergut, E. A. Grulke; Wiley-Interscience; 4 edition (Feb. 22, 1999); ISBN-10: 0471166286; ISBN-13: 978-0471166283).

When the polymer M is a stimuli responsive polymer, the dispersion or aggregation of the particle-containing entities P-(A---B-M)$_x$ within the dispersing phase may be also controlled by applying an appropriate physicochemical stimulus to the medium, such as varying the temperature, the pH, or the ionic strength, or subjecting the medium to light, depending on the type of stimuli responsive polymer.

One advantage of the present invention is that once the particle-containing entities P-(A---B-M)$_x$ are dispersed in the medium, they may be then aggregated by decreasing the solubility of the polymers M into the medium. As described above, it can be done either by heating or cooling the dispersion when the pair solvent/polymer M exhibits an upper critical solution temperature or a lower critical solution temperature, or by applying an appropriate physicochemical stimulus to the medium when the polymer M is a stimuli responsive polymer. By the same token, the viscosity of the dispersion may be increased or decreasing as desired.

After aggregation, the particle-containing entities P-(A---B-M)$_x$ may be recovered by physical separation, such as filtration or centrifugation.

After recovery, the particle-containing entities P-(A---B-M)$_x$ may be then re-dispersed in the same or a different medium.

In another embodiment, the dispersion or aggregation of the particle-containing entities P-(A---B-M)$_x$ within the dispersing phase may be also controlled by adjusting a magnetic or electrical field. For instance, magnetic particles P such as magnetites or ferrites can be aggregated by applying a magnetic field and re-dispersed when the field is cut off. In the same way, conductive particles, such as carbon nanotubes can be dispersed by applying an electrical field and aggregated when the field is cut off.

In another embodiment, after recovery, the particle-containing entities P-(A---B-M)$_x$ may be subjected to a treatment in order to break the supramolecular interactions -A---B-. It can be done by techniques well known by the person skilled in the art (as described above). For instance, the breaking of the supramolecular interactions can be done by adding a selective dissociating agent, said dissociating agent being hydrogen-acceptor or hydrogen-donor small polar and/or protic heteroatomic organic molecule capable of disrupting the host-guest supramolecular interactions -A---B- by breaking the hydrogen-bonds that link the X-H and Y hydrogen-bonding sites within functional groups A and B as defined above, such as DMSO.

The Medium or Dispersing Phase

The medium or dispersing phase may be any kind of liquid medium in which particles can be dispersed.

In one embodiment, the medium can be a solvent, for instance a polar, apolar, protic, aprotic, ionic or non ionic solvent. It can be a mixture of various solvents.

In one embodiment, the particle-containing entity P-(H---G-M)$_x$ can be dispersed in water or in aqueous solutions. In this embodiment, the pH of the solution can be comprised between 3 and 11, preferably between 4 and 10, and even more preferably between 5 and 8.

In another embodiment, the medium can be a polymer matrix obtained from a polymer melt devoid of solvent or from a polymer solution after evaporation of the solvent.

The polymeric matrix may be of any type, preferably a natural rubber, an epoxidized natural rubber (ENR), a polyisoprene, a polydiene, a polyacrylate, a polymethacrylate, a styrene-butadiene rubber (SBR), a nitrite rubber, a silicon based matrix and the like. The polymeric matrix may be obtained from a hot melt or from a solution.

In a specific embodiment, the medium can be a reactive blend devoid of solvent comprising a polymerizable and/or cross-linkable compound and optionally a polymerization initiator or a catalyst.

In this blend, the polymerizable and/or cross-linkable compound can be mono- or multifunctional monomers, or mono- or multifunctional polymerizable polymers or oligomers.

Catalysts may be any types of catalysts used in radical polymerization, controlled radical polymerization coordination polymerization, metathesis polymerization, ring opening polymerization, anionic polymerization, cationic polymerization, polycondensation or polyaddition.

The radical initiators may be photo-initiators or thermal initiators.

Methods

One object of the present invention is a method for preparing said particle-containing entity P-(A---B-M)$_x$, said method comprising the following steps:
- attaching the functional group A to the surface of the solid particle P, thereby forming A-functionalized particles P,
- attaching the functional group(s) B to one end of the polymeric chain of polymer M, thereby forming B-functionalized polymers M, and wherein the functional group B is able to form a supramolecular interaction -A---B- with the functional group A through 2 to 8 hydrogen bonds,
- mixing the A-functionalized particles P with at least one B-functionalized polymer M to form a supramolecular interaction -A---B- constituted by 2 to 8 hydrogen bonds, thereby forming the particle-containing entity P-(A---B-M)$_x$ with x being greater than or equal to 1.

In another embodiment, the present invention is directed to a method for sequentially forming and, breaking the supramolecular interactions -A---B- in the particle-containing entity P-(A---B-M)$_x$ described above, said method comprising the following steps:
- attaching the functional group A to the surface of the solid particle P, thereby forming A-functionalized particles P,
- attaching the functional group(s) B to one end of the polymeric chain of polymer M, thereby forming B-functionalized polymers M, and wherein the functional group B is able to form supramolecular interactions with the functional group A through 2 to 8 hydrogen bonds,
- mixing the A-functionalized particles P with at least one B-functionalized polymer M to create supramolecular interactions -A---B- constituted by the 2 to 8 hydrogen bonds, thereby forming the particle-containing entity P-(A---8-M)$_x$,
- breaking the supramolecular interactions -A---B- that link the A-functionalized particles P and the B-functionalized polymers M.

This method can further comprise a step of recovering particles P after the breaking of the supramolecular interactions -A---B- by physical separation, such as filtration or centrifugation.

Another object of the present invention is a method for preparing the dispersion of solid particles P in a medium described above, said method comprising the following steps:
- attaching the functional group A to the surface of the solid particle P, thereby forming A-functionalized particles P,
- attaching the functional group(s) B to one end of the polymeric chain of polymer M, thereby forming B-functionalized polymers M, and wherein the functional group B is able to form supramolecular interactions with the functional group A through 2 to 8 hydrogen bonds,
- mixing the A-functionalized particles P with at least one B-functionalized polymer M to create a supramolecular interactions -A---B- constituted by the 2 to 8 hydrogen bonds, thereby forming the particle-containing entity P-(A---B-M)$_x$ with x being greater than or equal to 1,
- dispersing the particle-containing entity P-(A---B-M)$_x$ in the medium.

In a preferred embodiment, the B-functionalized polymers M are soluble or solubilized in the medium and induce steric or electrostatic repulsion between the particles P in the medium.

In a preferred embodiment, the polymers M and the melt chains of the polymer melt in which particles-containing entities P-(A---B-M)$_x$ are dispersed present a negative Flory interaction parameter $\chi$.

The step of mixing said A-functionalized particles P with said B-functionalized polymers M in the medium to form supramolecular interactions -A---B- through 2 to 8 hydrogen bonds may be carried out in the conditions described in the state of the art (as described previously).

The dispersing step may be carried out mechanically or by using a mechanochemical method, such as ultrasonication, ball-milling, or grinding.

Another object of the present invention is a method for sequentially dispersing and aggregating A-functionalized particles P in a medium, said method comprising the following steps:
- preparing a dispersion of A-functionalized solid particles P in said medium according to the method previously described, thereby forming the particle-containing entities P-(A---B-M)$_x$ dispersed in said medium wherein the B-functionalized polymers M are reversibly attached to the A-functionalized particles P through one or several supramolecular interactions -A---B- constituted by the 2 to 8 hydrogen bonds,
- aggregating the A-functionalized particles P by either reducing the solubility of the polymers M in the medium and/or by breaking the supramolecular interactions -A---B-.

As mentioned previously, the aggregation of the particles P may, in one embodiment, be operated by decreasing the solubility of the polymers M in the dispersing medium, thereby reducing the steric or electrostatic repulsion between polymers M in the medium. This can be done by heating or cooling the dispersion when the pair medium/polymers M exhibits an upper critical solution temperature or a lower critical solution temperature, as described above. When the polymer M is a stimuli responsive polymer, it may be done by applying the appropriate physicochemical stimuli, as described above. For instance, it may be done by varying the temperature, the pH or the ionic strength of the dispersion, or by subjecting the dispersion to light. When particles are magnetic or conductive particles, it may be done by applying an external magnetic or electrical field, as described previously.

In a preferred embodiment, reducing the solubility of the polymers M in the medium may be carried out by a modification of the temperature of the medium, thereby recovering the particle-containing entities P-(A---B-M)$_x$.

When the aggregation of the particles P is operated by decreasing the solubility of the polymer M in the dispersing medium, the method of the invention may further comprise a step of recovering the particle-containing entities P-(A---B-M)$_x$ after the step of aggregation by physical separation, such as filtration or centrifugation.

The method may further comprise a step of breaking the supramolecular interactions -A---B- when the particles recovered are in the form of the particle-containing entities P-(A---B-M)$_x$, thereby recovering A-functionalized particles.

In another embodiment, the aggregation of the particles P in the medium may also be operated by breaking the supramolecular interactions -A---B-. The breaking of these supramolecular interactions may be carried out according to the conditions known in the state of the art as previously described. For instance, the breaking of the supramolecular interactions -A---B- can be done by adding a selective dissociating agent such as DMSO.

In this embodiment, the method of the invention may further comprise a step of recovering the A-functionalized particles P by physical separation, such as filtration or centrifugation.

After recovery, the A-functionalized particles P may be then re-dispersed in the same or in a different medium by attaching at least one B-functionalized polymer M to the A-functionalized particles P through one or several supramolecular interactions -A---B- constituted of 2 to 8 hydrogen bonds, wherein A and B are functional groups respectively grafted to P and M thus forming a particle-containing entity P-(A---B-M)$_x$ with x being greater than or equal to 1.

Such dispersion/aggregation/recovery/re-dispersion cycle can be achieved multiple times thanks to the reversible nature of the supramolecular interactions -A---B- that link the A-functionalized particles P and the B-functionalized polymers M in the particle-containing entity P-(A---B-M)$_x$.

Applications

One object of the invention is also a composition comprising the particle-containing entities P-(A---B-M)$_x$ previously disclosed or the dispersion of the invention. In particular, the composition can be a liquid composition such as an ink, painting, colorant, personal care formulation, a polymer melt or a reactive medium that can be polymerized and/or cross-linked as described above.

The solid particle P attached to at least one polymer M through one or several supramolecular interactions -A---B- of the invention may be also used as a catalyst in a reaction medium.

The particles of catalyst may be easily recovered from the reaction medium by aggregating the particles as described above, and then recovered by physical separation from the reaction medium.

The present invention will be further clarified by the following examples, which are intended to be purely exemplary of the present invention.

EXAMPLES

Example 1

Preparation of aminophenyl-thymine Derivative

The purpose of this example is to describe the preparation of an aminophenyl derivative of thymine that could be later chemically-bonded to particle P to form the A-functionalized particle P.

Thymine-1-acetic acid (30 mmol) was dissolved in 150 mL of DMF. p-phenylenediamine (60 mmol), TBTU (O-(Benzotriazol-1-yl)-N,N,N',N'-tetramethyluronium tetrafluoroborate, 30 mmol) and DIEA (N,N-Diisopropylethylamine, 60 mmol) were then added under vigorous stirring. The reaction was carried out at room temperature for 24 hours. Most of the solvent was the evaporated and the condensed solution was poured into a large amount of water to make aminophenyl-thymine derivative precipitate. The product was recovered by filtration and dried under vacuum.

The chemical structure of the resulting materials was confirmed by NMR (using a Bruker 400 MHz, model AC300 NMR spectrometer with DMSO-$d_6$ solvent).

Examples 2-3

Preparation of B-Functionalized Polymers M
(B=DAT and M=PS, PPO/PEO)

The purpose of these examples is to describe the preparation of B-functionalized polymers M that could be later used to disperse A-functionalized particles in the medium as the particle-containing entity P-(A---B-M)$_x$.

The B-functionalized polymers M were obtained by reaction of amino-ended polymers M and 2-chloro-4,6-diamino-1,3,5-triazine (DAT).

Amino-ended PPO/PEO Jeffamine® M2005 (6.2 mmol) was dissolved in 100 mL of a EtOH/water mixture (v/v 1/1). 2-chloro-4,6-diamino-1,3,5-triazine (DAT, 6.9 mmol) and NaHCO$_3$ (6.9 mmol) were added, and the resulting suspension was stirred under reflux for 24 h. Since DAT was only partially soluble in this solvent, the reaction mixture started as a white suspension that transformed into a limpid solution as the reaction progressed. Ethanol was removed in vacuo from the reaction mixture. After extraction with toluene (2×60 mL), the combined organic layers were washed with water (3×50 mL), dried over anhydrous magnesium sulfate, filtered, evaporated and dried under vacuum at 80° C. NMR analyses in DMSO-$d_6$ showed that the desired product PPO/PEO-DAT was formed.

The amino-ended polystyrene was synthesized according the following procedure (Coessens, V.; Nakagawa, Y.; Matyjaszewski, K.; *Polym. Bull.* 1998, 40, 135-142). Styrene was purified by passing through a basic alumina column and then bubbled with N$_2$ for 30 min. Copper(I) bromide (0.277 mmol) was charged in a flask. The flask was deoxygenated with N$_2$ for 30 minutes and styrene (69.8 mmol) and N,N,N',N",N"-pentamethyldiethylenetriamine (PMDETA) (0.277 mmol) were added. The solution turned light green as complex formation occurred. CuBr$_2$/PMDETA (1.16×10$^{-6}$ mol) in 0.05 mL of DMF was added followed by ethyl 2-bromopropionate (EBP) (1.16 mmol). The flask was placed in an oil bath heated at 70° C. for 18 hours. During polymerization, samples were periodically taken under N$_2$ atmosphere, and conversion (30%) and molecular weights ($M_w$=3600 g/mol) were determined by $^1$H NMR and SEC, respectively. Polymerization was stopped by exposing the reaction mixture to air. Copper catalyst was immediately removed by passing the crude product through a column filled with neutral alumina. Unreacted monomer was removed under vacuum. The resulting bromide-ended polystyrene (0.3 mmol) was then dissolved in 15 mL of DMF and sodium azide was added (0.6 mmol). The reaction mixture was stirred at room temperature for 14 hours and polymer was subsequently precipitated in excess of methanol. Polystyrene azide derivative (0.3 mmol) was dissolved in 10 mL of dry THF and 1 eq. of triphenylphosphine PPh$_3$ was added. The reaction mixture was stirred under nitrogen at room temperature for 24 hours, then allowed to stand to air and added with 1 mL of H$_2$O. Stirring was maintained over 48 hours. Amino-ended polystyrene was recovered by precipitation in an excess of heptane.

Amino-ended polystyrene (0.11 mmol) was dissolved in a mixture of 50 mL of toluene and 25 mL of DMF. 2-chloro-4,6-diamino-1,3,5-triazine (0.22 mmol) was added and the mixture was heated to 90° C. for 24 h under vigorous stirring. PS-DAT was then precipitated in excess of methanol. NMR analyses in CDCl$_3$ showed that the desired product PS-DAT was formed.

Examples 4-21

Preparation of A-Functionalized Particles and Resulting Dispersions in Media Containing B-Functionalized Polymers The purpose of these examples is to illustrate the dispersability of A-functionalized particles P in solutions containing B-functionalized polymers M thanks to the supramolecular bonds -A---B-. These examples illustrate dispersions obtained by the present invention. For examples 4-21, a two step reaction sequence was followed, as shown in equation 1. In the first step, chemical groups containing functional group A were attached to the surface of particles P, thereby forming the A-functionalized particles P (example 4). In a subsequent step, the A-functionalized particles P were dispersed in a medium S containing B-functionalized polymers M. Particles were dispersed in the medium as the particle-containing entities P-(A---B-M)$_x$. The scheme below is meant to be illustrative but not limiting. In contrast, and to illustrate particles dispersions of the present invention, non-functionalized particles P were dispersed in solutions containing B-functionalized polymer M, A-functionalized particles P were dispersed in solutions containing non-functionalized polymer M and A-functionalized particles P were dispersed in a pure medium S.

Equation 1

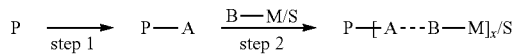

Examples are given below for P=multiwall carbon nanotubes (MWCNT), A=thymine (Thy), B=2,6-diamino-1,3,5-triazine (DAT), M=polystyrene (PS), poly(propylene oxide-ethylene oxide) (PPO/PEO) and S=cyclohexane, toluene, chloroform, acetone, isopropyl alcohol, and water.

Example 4

Preparation of Thymine-Functionalized Multi-Wall Carbon Nanotubes (P=MWCNT, A=Thymine)

MWCNT (Oraphistrength C 100, Arkema) have been purified by acid treatment (sulfuric acid bath at 100° C. for 6 h, then water wash until neutral pH). Pristine MWCNT (CNTp) (60 mg) were sonicated in 100 mL of distilled water for 1 h and isoamylnitrite (20 mmol) and thymine phenylamine derivative (20 mmol) were added. The reaction mixture was then heated at 100° C. under vigorous stirring. After 24 hours, most of the water was evaporated and 50 mL of DMF were added. CNT-Thy were recovered by filtration on a PTFE membrane or by centrifugation and few DMF washes. Grafting was followed by IR, Raman and TOA. The organic content loss of mass measured by TOA was around 30% which corresponded to 1 thymine group per 50 carbon atoms.

Examples 5-21

Preparation of Dispersions of Thymine-Functionalized MWCNT (CNT-Thy) and Pristine MWCNT (CNTp) in Different Solvents S Containing B-Functionalized Polymers M or Non-Functionalized Polymers or in Pure Solvents S (A=Thymine, B=NH$_2$, DAT, M=PS, PPO/PEO, and S=Cyclohexane, Toluene, Chloroform, Acetone, and Water)

The purpose of these examples is to illustrate the dispersability of A-functionalized particles in solutions containing B-functionalized polymers M thanks to the supramolecular bonds -A---B-. These examples illustrate dispersions obtained by the present invention.

The following general procedure was followed for preparing dispersions of thymine-functionalized MWCNT (CNT-Thy) and non-functionalized pristine MWCNT (CNTp).

0.05 wt. % MWCNT were dispersed by ultrasonication (150 W, 30 min) in 0.1 wt. % DAT-polymer M solutions (examples 5-10), or in 1 wt % of DAT-polymer M (examples 11-12) or in 0.1 wt % NH$_2$-polymer M solutions (examples 13-18).

According the same procedure, dispersions in pure solvents were prepared for CNTp and CNT-Thy. Dispersions were allowed to stand 24 hours and observed using a Leica Leitz DMRD light microscope containing a calibrated ocular lens (10×/0.30 PH1). Images were analyzed with ImageJ to determined particle size. The threshold of detection was -0.5 µm$^2$ (one pixel surface) and detected area were converted in projected area diameter $d_p$, i.e. the equivalent diameter of a circle with the same area as the 20 projection of the particle. The dispersion was considered as stable when detected aggregates represented less than 1% of the total analyzed surface and when their average projected area diameter $d_p$ was less than 5 µm. Results are set in table 1.

TABLE 1

| examples | MWCNT | B-M | medium S | % detected aggregates (>0.5 µm$^2$) | average projected area diameter (µm) |
|---|---|---|---|---|---|
| 5 | CNT-Thy | DAT-PS | cyclohexane at 50° C. | 0.94 | 4.01 |
| 6 | CNTp | DAT-PPO/PEO | toluene | aggregated | |
| 7 | CNT-Thy | DAT-PPO/PEO | toluene | 0.68 | 1.81 |
| 8 | CNT-Thy | DAT-PS | toluene | 0.78 | 2.81 |
| 9 | CNT-Thy | DAT-PPO/PEO | chloroform | 0.16 | 3.22 |
| 10 | CNT-Thy | DAT-PPO/PEO | acetone | 0.34 | 4.49 |
| 11 | CNTp | DAT-PPO/PEO | water at 5° C. | aggregated | |
| 12 | CNT-Thy | DAT-PPO/PEO | water at 5° C. | 0.19 | 3.94 |
| 13 | CNTp | NH$_2$-PPO/PEO | toluene | aggregated | |
| 14 | CNT-Thy | NH$_2$-PPO/PEO | toluene | aggregated | |
| 15 | CNTp | NH$_2$-PS | toluene | aggregated | |
| 16 | CNT-Thy | NH$_2$-PS | toluene | aggregated | |
| 17 | CNTp | NH$_2$-PPO/PEO | water at 5° C. | aggregated | |

TABLE 1-continued

| examples | MWCNT | B-M | medium S | % detected aggregates (>0.5 μm²) | average projected area diameter (μm) |
|---|---|---|---|---|---|
| 18 | CNT-Thy | NH$_2$-PPO/PEO | water at 5° C. | aggregated | |

These examples show that stable, conventional dispersions can be prepared with thymine-functionalized MWCNT and DAT-functionalized polymers M in a good solvent of the DAT-functionalized polymers M, thanks to the supramolecular interaction formed between thymine and DAT motifs. Dispersions are stable even in water and isopropyl alcohol which are known to break hydrogen bonds. With non-functionalized MWCNT and/or non-functionalized polymer M, possible formed hydrogen bonds between MWCNT and polymer M are not strong and/or selective enough to ensure dispersion. All examples in pure solvents are aggregated (CNTp and CNT-Thy).

Examples 19-21

Aggregation of Thymine-Functionalized MWCNT in Toluene Containing DAT-Functionalized Polystyrene Using Selective Dissociating Agent Z (Z=DMSO, Methyl Alcohol, Ethyl Alcohol)

These examples illustrate the controlled aggregation of thymine-functionalized MWCNT (CNT-Thy) in solution of DAT-functionalized polystyrene (DAT-PS) by breaking the supramolecular interaction Thy---DAT. 2 droplets of dissociating agent Z were added to a stable dispersion of CNT-Thy in toluene (example 8). Aggregation took place. CNT-Thy were separated from the DAT-PS solution by centrifugation.

| examples | dissociating agent | total aggregation time (min) |
|---|---|---|
| 19 | DMSO | 20 |
| 20 | MeOH | 20 |
| 21 | EtOH | 30 |

These examples show that stable dispersions of CNT-Thy in solution of DAT-functionalized polymer can be aggregated by breaking the supramolecular interactions -Thy---DAT- that link the thymine-functionalized particles P and the DAT-functionalized polymers M, by adding a dissociating agent.

Example 22

Re-Dispersion in Aqueous Solution Containing DAT-Functionalized poly(propylene oxide-ethylene oxide) of Previously Aggregated Thymine-Functionalized MWCNT This example illustrate illustrates the MWCNT recycling after controlled aggregation of thymine-functionalized MWCNT (examples 19-21) and re-dispersion as described in examples 5-12.

Aggregation was induced in a 0.05 wt % CNT-Thy/0.1 wt % DAT-functionalized polystyrene (DAT-PS) in toluene solution, by adding 2 droplets of DSMO (example 19). After complete aggregation, CNT-Thy were separated from the DAT-PS solution by centrifugation. CNT-Thy hence recovered could then be re-dispersed in acetone in presence of DAT-PPO/PEO (as example 10). Dispersions and aggregation were observed using a Leica Leitz DM RD light microscope containing a calibrated ocular lens (10×/0.30 PHI). Images were analyzed with ImageJ to determined particle size. The dispersion was considered as stable since detected aggregates represented less than 1% of the total analyzed surface and their average projected area diameter $d_p$ was less than 5 μm. Aggregation/recovery/re-dispersion procedures were repeated at least twice.

This example shows that CNT-Thy in solution of DAT-functionalized polymer can be aggregated by adding a dissociating agent. CNT-Thy can be recovered by centrifugation and re-dispersed in others solvents in the presence of soluble DAT-functionalized polymers M.

Examples 23-24

Temperature Controlled Aggregation and Re-Dispersions of A-Functionalized Particles in Solvent S Containing B-Functionalized Polymers M in Theta-Conditions (P=MWCNT, A=Thy, B=DAT, M=PS, PPO/PEO, S=Cyclohexane, Water)

The purpose of these examples is to illustrate the controlled aggregation/dispersion process of A-functionalized particles in a solution of B-functionalized polymers by changing the temperature, when solvent/polymer M couple exhibits an upper critical solution temperature or a lower critical solution temperature.

The following general procedure was followed for aggregating thymine-functionalized MWCNT. The procedure is meant to be illustrative but not limiting. A stable dispersion at a temperature T1 was heated or cooled to a temperature T2. Aggregation was macroscopically observed. The non-homogeneous solution was then cooled or heated to temperature T1, under stirring or sonication. Aggregation and re-dispersion were observed using Leica Leitz OM RD light microscope containing a calibrated ocular lens (10×/0.30 PHI). Images were analyzed with ImageJ to determined particle size. The dispersion was considered as stable since detected aggregates represented less than 1% of the total analyzed surface and their average projected area diameter $d_p$ was less than 5 μm. All aggregation/re-dispersion procedures were repeated at least twice.

Examples 23

Temperature Controlled Aggregation and Re-Dispersions of Thymine-Functionalized MWCNT in Cyclohexane Containing DAT-Functionalized Polystyrene The couple cyclohexane/polystyrene exhibits an upper critical solution temperature.

This means that there is a temperature theta at which polystyrene is no longer soluble (theta=31-33° C.) in cyclohexane. A stable dispersion of CNT-Thy in presence of DAT-PS (example 5) in cyclohexane was heated to 50° C. When cooled to 0-5° C., aggregation occurred within 10-30 minutes. When re-heated to 50° C., re-dispersion occurred within 10 minutes under sonication. The re-dispersion was considered as stable since detected aggregates represented 0.96% of the total analyzed surface and their average projected area diameter $d_p$ was 4.56 μm.

Examples 24

Temperature Controlled Aggregation and Re-Dispersions of Thymine-Functionalized MWCNT in Water Containing DAT-Functionalized poly(propylene oxide-ethylene oxide)

The couple water/poly(propylene oxide-ethylene oxide) (Jeffamine® M2005) exhibits a lower critical solution temperature. This means that there is a temperature theta at which poly(propylene oxide-ethylene oxide) is no longer soluble (theta=18° C.). A stable dispersion of CNT-Thy in presence of DAT-PPO/PEO in water (example 12) was cooled to 5° C. When heated to 50° C., aggregation occurred within 10-30 minutes. When re-cooled to 5° C., re-dispersion occurred within 10 minutes under sonication. The re-dispersion was considered as stable since detected aggregates represented 1% of the total analyzed surface and their average projected area diameter $d_p$ was 3.79 μm.

These examples show that stable dispersions of thymine-functionalized particles in solution of DAT-functionalized polymers M can be aggregated and re-dispersed by changing the temperature, when solvent is a theta-solvent of the polymer.

The invention claimed is:

1. A particle-containing entity P-(A---B-M)$_x$ wherein P is a solid particle attached to at least one polymer M through supramolecular interactions -A---B- constituted by 2 to 8 hydrogen bonds X—H---Y, wherein A and B are functional groups respectively grafted to P and M thus forming the particle-containing entity P-(A---B-M)$_x$ with x being greater than or equal to 1, functional group(s) B being positioned at one end of the polymeric chain of polymer M, X and Y are heteroatoms present in A and B functional groups, H is hydrogen, and M has a degree of polymerization comprised between 5 and 1000, wherein the A-functionalized particles P are attached to more than one polymer M, wherein at least one polymer M is not a biopolymer, and wherein the polymer M further contains between 1 and 5 pending polymerizable groups G.

* * * * *